(12) United States Patent
Wilder et al.

(10) Patent No.: US 6,557,170 B1
(45) Date of Patent: Apr. 29, 2003

(54) KEYBOARD, MOUSE, VIDEO AND POWER SWITCHING APPARATUS AND METHOD

(75) Inventors: David E. Wilder, Huntsville, AL (US); Douglas D. Reed, Meridianville, AL (US); Steven F. Brown, Huntsville, AL (US); Remigus G. Shatas, Huntsville, AL (US)

(73) Assignee: Cybex Computer Products Corp., Huntsville, AL (US)

( * ) Notice: Subject to any disclaimer, the term of this patent is extended or adjusted under 35 U.S.C. 154(b) by 0 days.

(21) Appl. No.: 09/073,178

(22) Filed: May 5, 1998

Related U.S. Application Data
(60) Provisional application No. 60/045,608, filed on May 5, 1997.

(51) Int. Cl.$^7$ .......................... H04N 1/173; G06F 11/00
(52) U.S. Cl. ...................... 725/130; 713/300; 713/340; 345/168; 710/72
(58) Field of Search ................... 725/87–150; 713/218, 713/300–340; 345/168; 710/62–63, 72–73

(56) References Cited

U.S. PATENT DOCUMENTS

| | | | | |
|---|---|---|---|---|
| 5,051,720 A | * | 9/1991 | Kittirutsunetorn | 340/2.4 |
| 5,793,999 A | * | 8/1998 | Mori | 710/305 |
| 5,913,034 A | * | 6/1999 | Malcolm | 709/223 |
| 5,923,103 A | * | 7/1999 | Pulizzi et al. | 307/126 |
| 5,968,116 A | * | 10/1999 | Day et al. | 709/202 |
| 6,199,180 B1 | * | 3/2001 | Ote et al. | 714/31 |

* cited by examiner

*Primary Examiner*—Chris Kelley
*Assistant Examiner*—Reuben M. Brown
(74) *Attorney, Agent, or Firm*—Nixon & Vanderhye P.C.

(57) ABSTRACT

A KVM switch is disclosed having on screen display (OSD) circuitry coupled to a user workstation for providing a user a convenient interface by which to operate the KVM switch. First switching circuitry coupled to a plurality of computers and coupled to the OSD circuitry allows a user to access any of the computers or the control functions of the KVM switch. Second switching circuitry coupled to switch electrical power to the computers and further coupled to the OSD circuitry allows a user of the KVM switch to selectively control electrical power to the computers.

2 Claims, 9 Drawing Sheets

KEYBOARD, MOUSE, VIDEO AND POWER SWITCHING APPARATUS AND METHOD

CONTINUING APPLICATION DATA

This application is a continuation-in-part of provisional patent application Ser. No. 60/045,608, filed May 5, 1997.

FIELD OF THE INVENTION

This invention relates generally to keyboard, video and mouse switches, commonly known as KVM switches, wherein at least one workstation is coupled to the KVM switch for operation of the switch, the workstation also connectable via the KVM switch to one of a plurality of computers, and particularly to such a KVM switch incorporating power control means so that an operator at the workstation may control electrical power to each of the computers.

BACKGROUND OF THE INVENTION

Conventionally, and referring to FIG. 1, prior art keyboard, video, and mouse (KVM) switching units, as illustrated by KVM unit 10, allow signals from a workstation or console 26 generally comprising a keyboard 12, mouse or other digital pointing device 14 and video signals to monitor 16 to be selectively coupled to/from a plurality of computers 18, 20, 22, and 24. These KVM switches 10 are conventionally provided with a plurality of computer interface ports so that a plurality of computer keyboard, video and mouse connections may be made to the KVM switch. As such, and by way of the example, shown in FIGS. 1 up to 4 keyboard, video and mouse connections from respective computers may be made to a single KVM switching unit 10. This allows a user at therefor console 26 to operate and display video from any one of computers 18–24 via KVM unit 10. Computers 18, 20, 22, 24 are typically file servers or used in applications not requiring continuous connection to keyboards, mice, and monitors. KVM unit 10 may be provided with an OSD (ON SCREEN DISPLAY) user interface 27, which provides convenient visual means, such as a selection of pop-up or pull-down menus, by which the user may operate KVM unit 10. KVM switching circuitry 28 is used to control routing of keyboard, mouse and video signals between the selected one of computers 18, 20, 22, 24 and console 26.

Most, if not all, of the KVM units marketed today contain at least one KVM channel microprocessor 30 that routes keyboard and mouse data and clock signals to a selected one of computers 18, 20, 22, 24, and a main microprocessor 32 that controls operation of KVM unit 10. The KVM channel microprocessors 30 each control a video switch (not shown in FIG. 1) to connect or disconnect a selected or deselected computer's video signals to/from an internal video bus that carries video signals from computers 18, 20, 22, 24 to monitor 16. Commands from main microprocessor 32 instruct channel microprocessors 30 as to when to activate or deactivate the video switch. Further, channel microprocessors 30 route data from computers 18, 20, 22, and 24 to main microprocessor 32.

Main microprocessor 32 passes keyboard and mouse signals from the selected one of computers 18, 20, 22, 24 to ON SCREEN DISPLAY interface 27, which serves as an interface for the user, typically by presenting the user with a series of menu screens from which to conveniently select from a variety of menu options that operate KVM unit 10. As stated, the OSD interface allows the user to view a variety of menu selections whenever he wishes to perform a switch, power control, or administrative function. In the case where the user is a supervisor, such as a system administrator, OSD interface 27 may be used to perform administrative functions such as assigning passwords and security levels to individual users. OSD user interface 27 is provided with an OSD main microprocessor 34, which is coupled to pass commands between keyboard 12, mouse 14 and KVM switch 28. Commands and responses passed on mouse and keyboard lines from keyboard 12 and mouse 14 allow OSD main microprocessor 34 to control the functions of KVM switch 28 and monitor its status. Video from KVM switch 28 passes through an OSD video circuit 36 which is controlled by an OSD video microprocessor 38 which is in turn controlled by OSD main microprocessor 34. OSD video circuit 36 normally passes video signals from KVM switch 28 to console video monitor 16. Upon activation of a menu, OSD video circuit 36 injects video signals which superimpose a menu or menus onto the video signals provided by KVM switch 28. OSD main microprocessor 34 is provided with program memory for storage of the interface program and menus required for operation of OSD main microprocessor 34, read/write memory (RAM), such as buffer memory for temporary storage of data, and non-volatile memory for permanent or semi-permanent storage of data such as the user's preferences for "hotkey" sequences used to activate the KVM switch features and user names and passwords. Commands are received by OSD video microprocessor 38 from OSD main microprocessor 34, causing OSD video circuit 36 to activate or deactivate. Console keyboard 12 is used to enter data or selections presented by the pop-up menus. When the user is not a performing a switching, or administrative function the console video monitor and the console keyboard are used as a normal video monitor and keyboard attached to KVM switch 28.

The keyboard and mouse data and clock signals from console keyboard 12 and mouse 14 are received by OSD main microprocessor 34 and normally passed to KVM switch 28. Signals from computers 18–24 are normally passed via KVM switch 28 to console keyboard 12 and mouse 14. With respect to "hot-key" sequences, OSD main microprocessor 34 responds by commanding OSD video microprocessor 38 to activate a pop-up menu. Concurrently, keyboard and mouse data and clock signals from console keyboard 12 and mouse 14 are prevented from being passed to KVM switch 28 while the pop-up menu is active. Rather, any keyboard or mouse commands applied to OSD main microprocessor 34 are used to change the pop-up menu content or set configuration data according to the keyboard and/or mouse entries by the user.

In some devices of the prior art, AC power from a conventional power source is simply applied to computers 18, 20, 22, and 24 from a power distribution unit 40, as shown in FIG. 1. In other prior art devices, as shown in FIG. 2, a power switch 42 is conventionally coupled to AC power and to an ASCII terminal 44 coupled to a microprocessor 46 inside power switch 42. Microprocessor 46 in turn is coupled to energize or deenergize, through appropriate drivers, relays or solid state power switching devices 48, 50, 52, and 54, which in turn couples or decouples AC power to computers 18, 20, 22, and 24. Some applications of this type power control system provide a means for individually switching ON or OFF the AC power to computers 18–24 from a remote location, and to implement security options such as password protection.

Some of the drawbacks of these computerized power switches are that the ASCII terminal that controls the power switch is separate from the console controlling the KVM switch, meaning that space must be made available for both the console and the ASCII terminal. Also, the menu options or other control scheme of the OSD interface is invariably different from the menu selections of the computerized power switch. This requires the operator to be familiar with two computerized control schemes instead of one, which is inconvenient and may lead to errors in operation of the systems. Further, two separate computerized systems requires that passwords and other security protocols and data bases be duplicated.

With respect to power control switches that are not under microprocessor control, these power switches must be operated manually, which is inconvenient if the power switch is remotely located from the console 12 operating KVM unit 10. Also, power status of these manually operated switches cannot be checked from a central location. Further, since there are no security provisions in these manually operated switches, they may be operated by anyone.

In view of the foregoing, it is one object of the invention to provide a KVM switch having integrated power switching functions and control coupled to the same OSD interface that controls the console keyboard, video and mouse signals and which further uses the same password and other security features included in the OSD interface. Other objects and advantages of Applicants new KVM switch will become apparent upon a reading of the following specification.

DETAILED DESCRIPTION OF THE DRAWINGS

Figure 1:
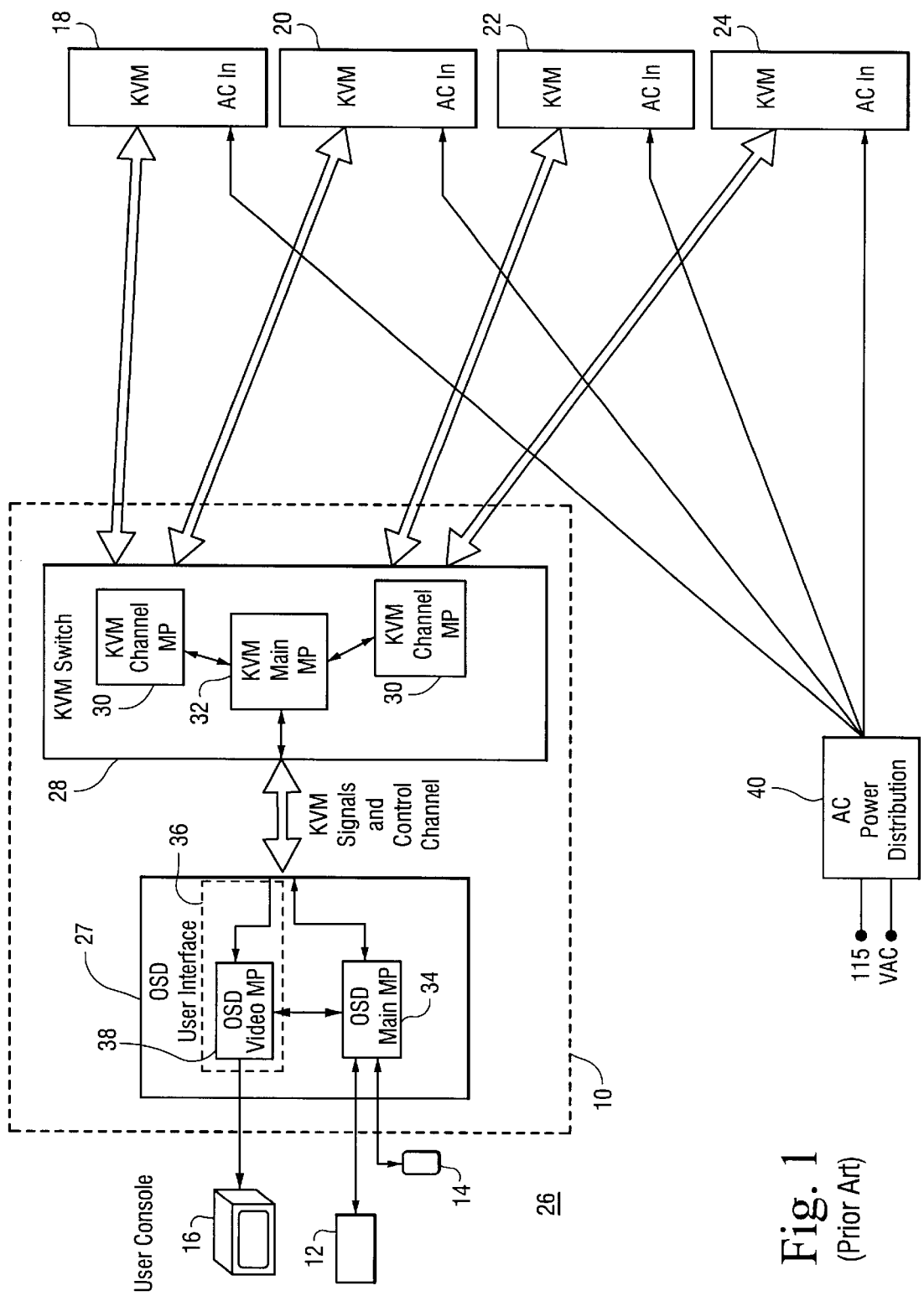
FIG. 1 is a block diagram of a prior art KVM switch shown coupled to four computers and a workstation.
Figure 2:
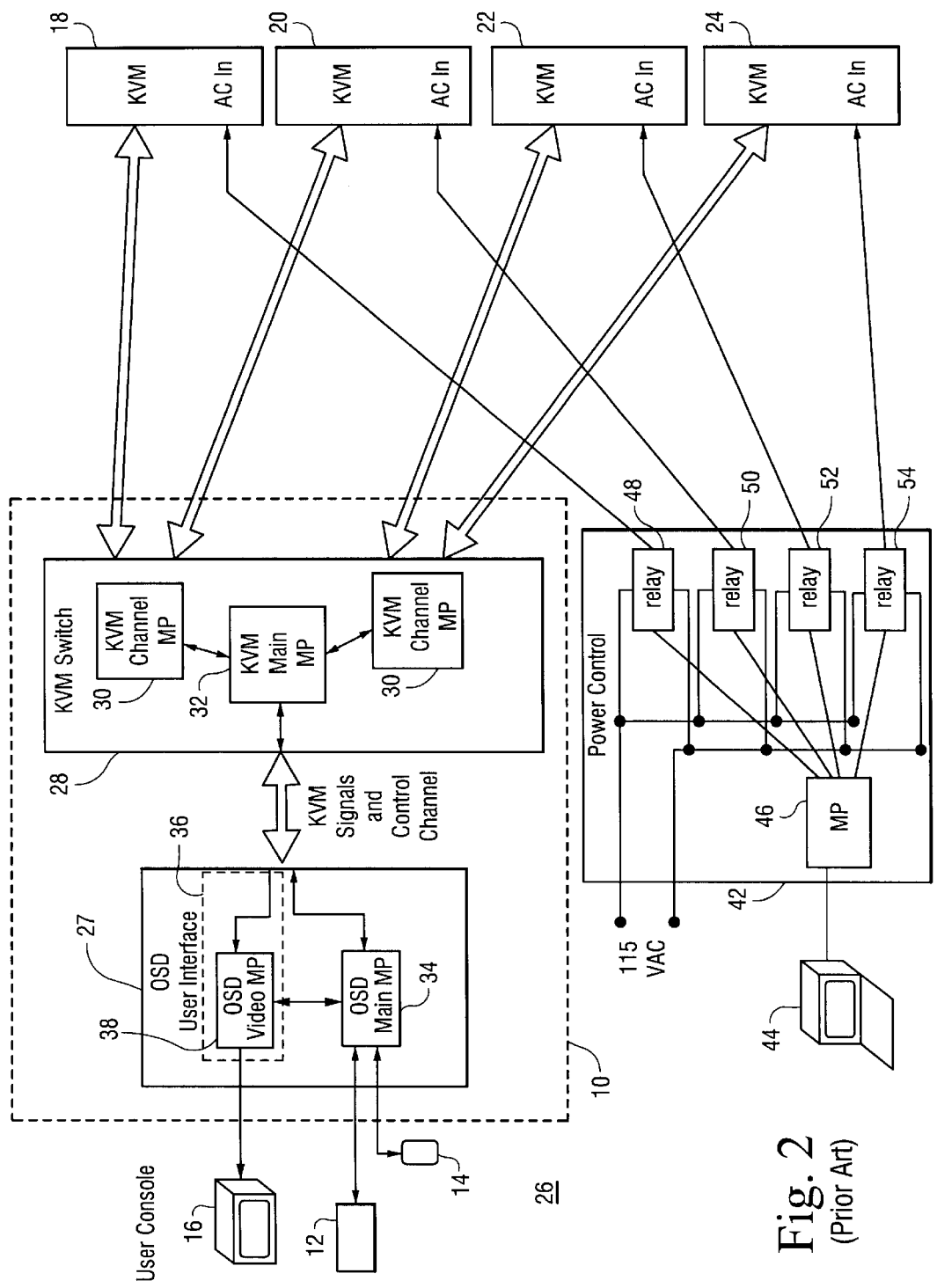
FIG. 2 is a block diagram of a prior art KVM switch similar to FIG. 1 and shown coupled to a power control station.
Figure 3:
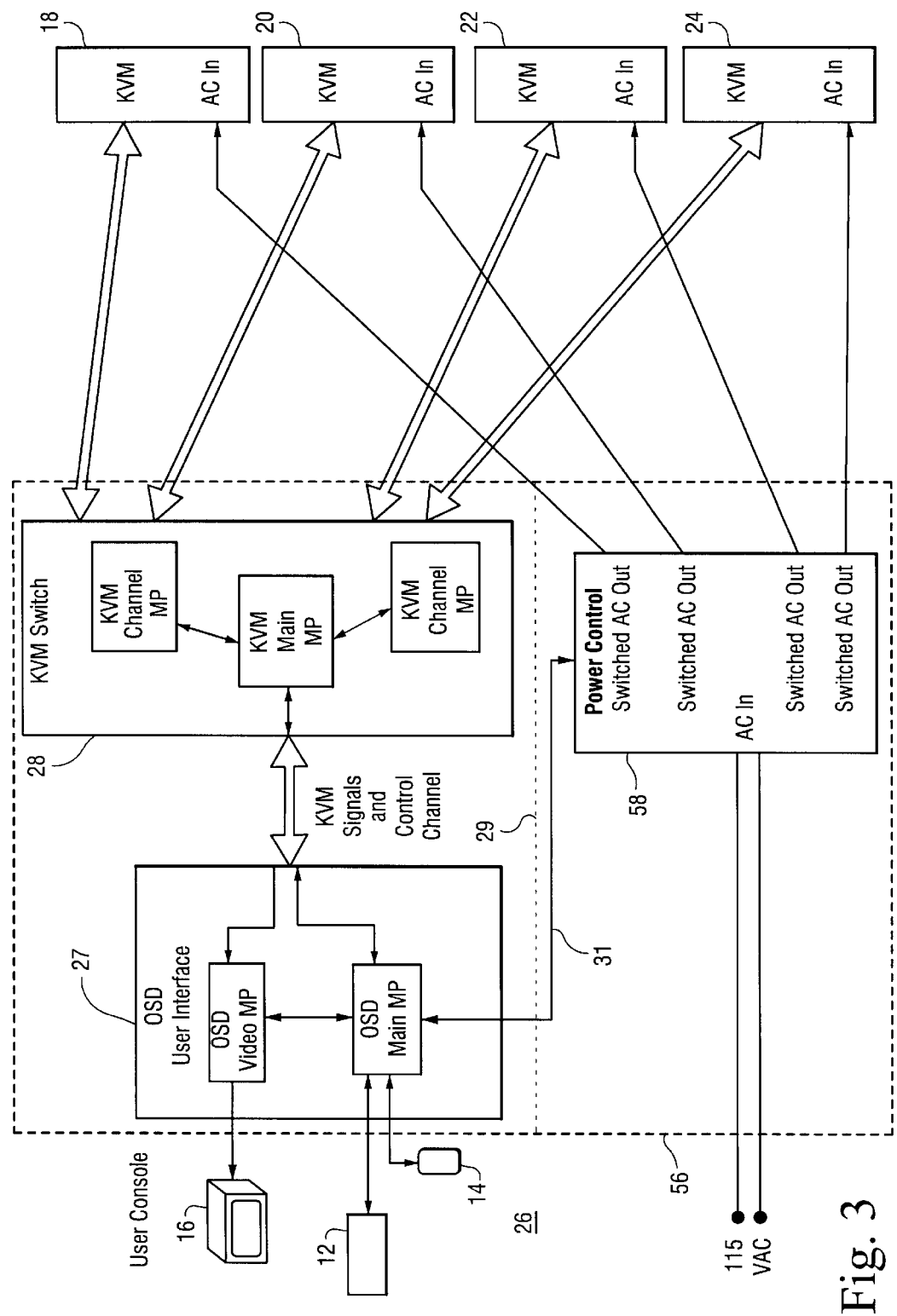
FIG. 3 is a block diagram of one embodiment of a KVM switch of the present invention.

In Applicants new KVM switch, and referring to FIG. 3, a first embodiment of the instant invention is represented by the components inside dashed lines 56, which dashed lines may represent an enclosure or other integrating structure, such as a rack mount. Power and ground potentials, while not shown, are conventionally provided to all components of Applicants KVM switch that require such potentials, as is apparent to one skilled in the art. In this first embodiment, a KVM switch 28 generally constructed as described above is conventionally coupled to discrete computers 18, 20, 22, 24. A power control switching circuit 58 is provided in enclosure or other structure 56, and is operatively coupled to OSD interface 27 via control lines or bus 31. OSD interface 27 is provided with appropriate programming instructions so as to control power control switching circuits 58, as will be further explained. Interface 27 serves as an interface between the user and KVM switch 28 and power control switching circuit 58. In a second embodiment of the instant invention, and as indicated by dashed line 29, the power control unit 58 may be a discrete stand-alone or rack mounted component coupled to OSD interface 27 by control lines 31. In this latter embodiment, power control unit 58 performs the same control functions, but is not mounted in the same enclosure with KVM switch 28 and OSD interface 27. As such, power control unit 58 may be located proximate computers 18, 20, 22, and 24, which may be remotely located from KVM switch 28 and OSD interface 27, with control lines 31 carrying signals between switch 28, interface 27 and power control unit 58.

Figure 4:
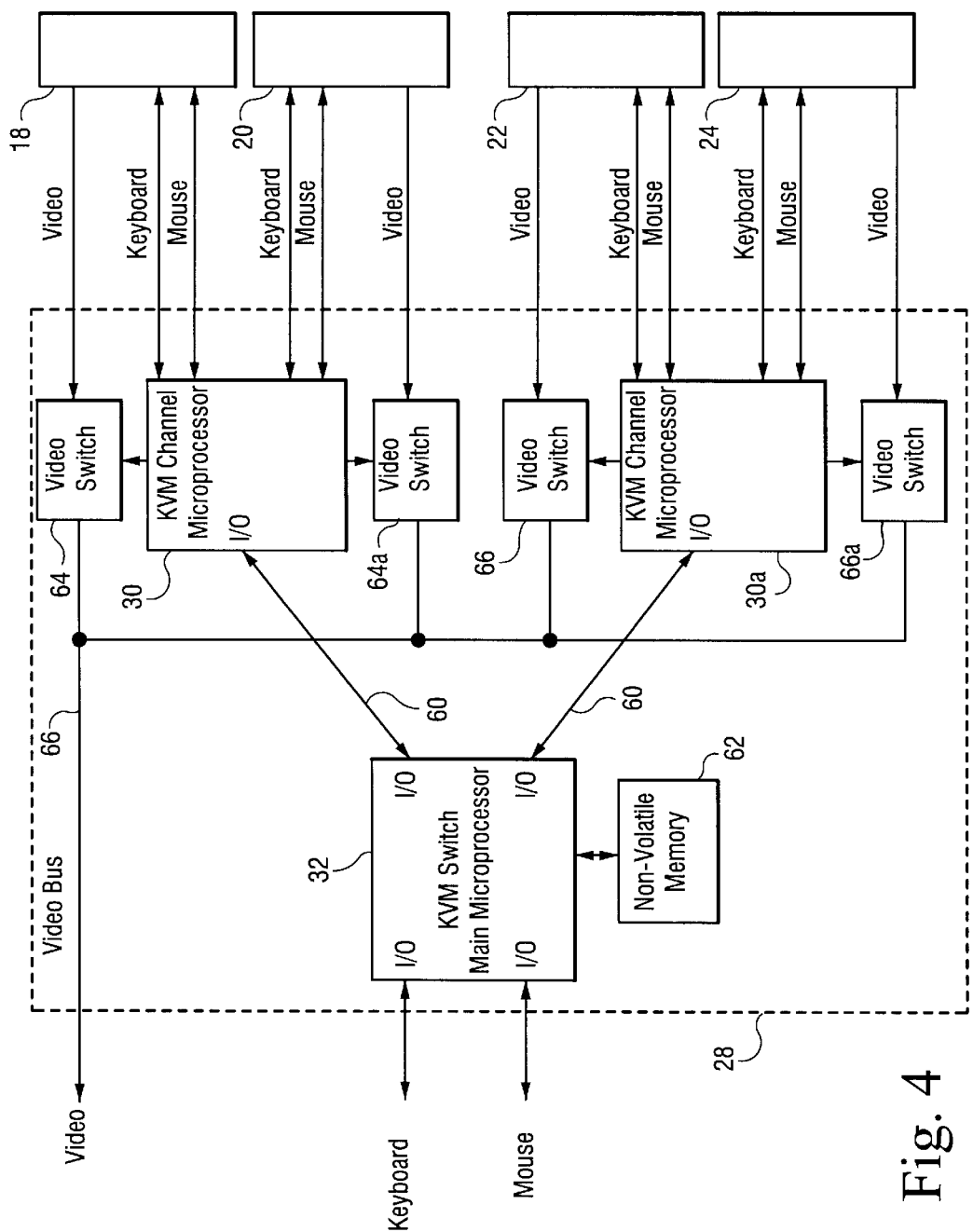
FIG. 4 is a block diagram of a portion of a KVM switch showing particulars of construction relating to switching of computers.
Figure 5:
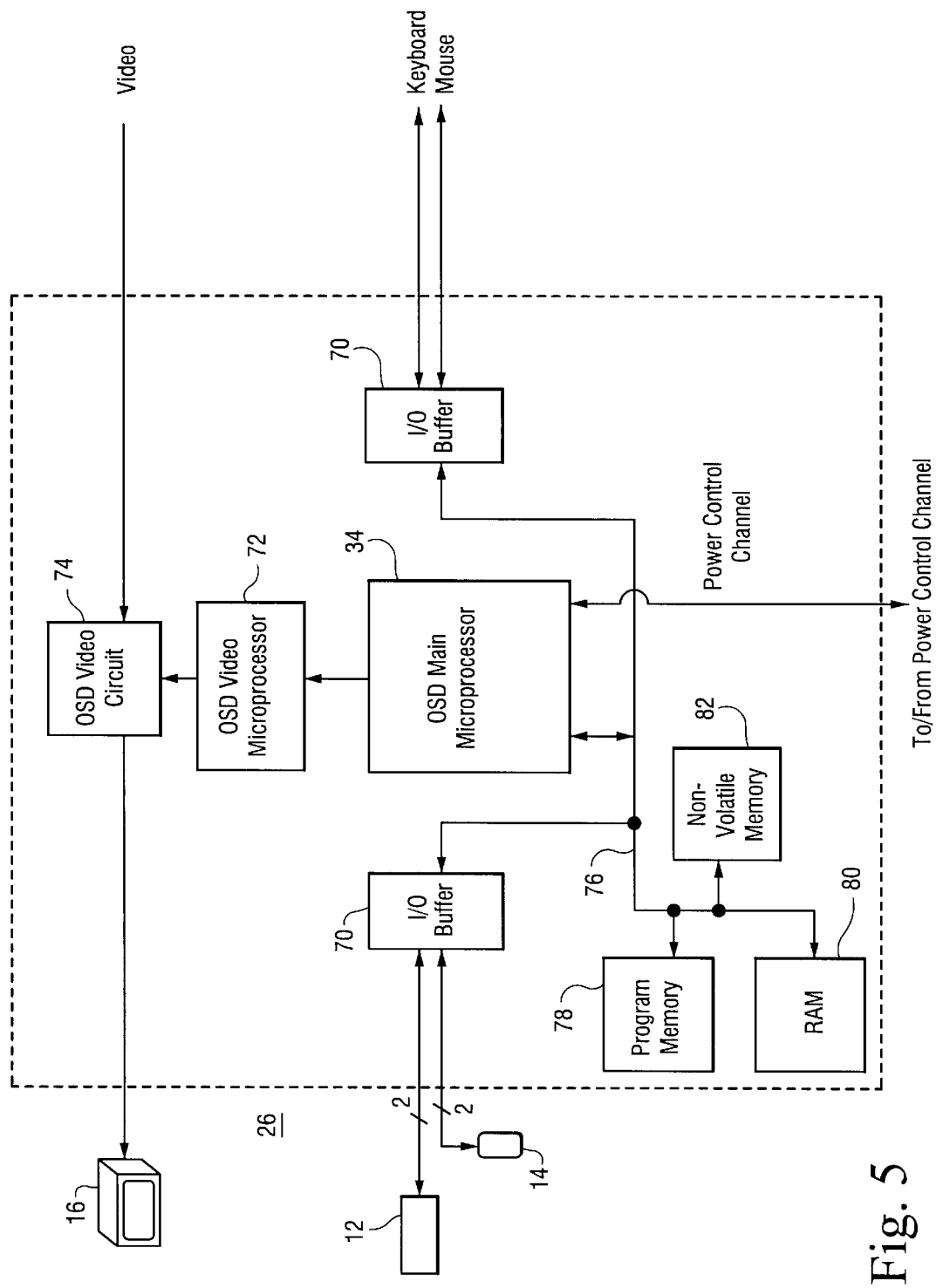
FIG. 5 is a block diagram of a portion of a KVM switch showing particulars of construction relating to video.
Figure 6:
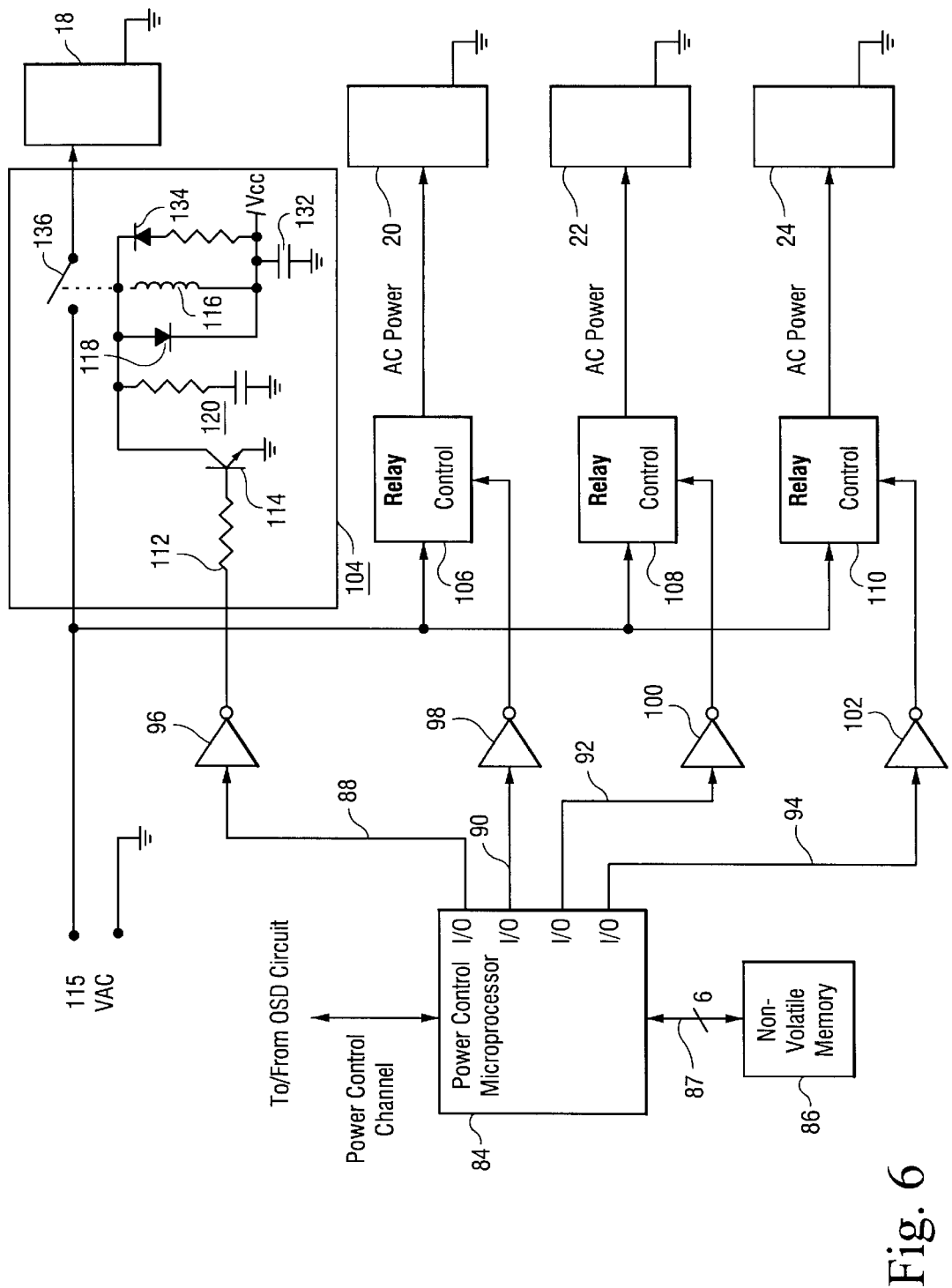
FIG. 6 is a partially block, partially schematic diagram showing particulars of construction relating to power control switching.

Referring to FIGS. 4, 5, and 6, the components within structure or enclosure 28 of the instant invention are shown in greater detail. In FIG. 4, details of a KVM switch 28 are shown, this switch including main microprocessor 32 coupled by data lines 60 to I/O ports of channel microprocessors 30, 30a. Main microprocessor 32 is provided with memory storage including nonvolatile memory 62, which may be used to store user preferences such as preferred hot key sequences. Channel microprocessor 30 directly controls switching of keyboard and mouse signals to/from computers 18, 20 and provides signals to video switches 64, 64a to effect coupling of one of these sets of video signals from computers 18, 20 to a video bus 66. Likewise, channel microprocessor 30a directly couples mouse and keyboard signals to computers 22, 24, and further provides signals to video switches 66, 66a to couple video signals from the selected one of computers 22, 24 to video bus 66.

Main microprocessor 32 (FIG. 4) receives keyboard clock and data and mouse clock and data signals from the OSD main microprocessor 34 (FIG. 5) via an I/O buffer 70, these keyboard and mouse signals originating at keyboard 12 and mouse 14. Alternately, mouse 14 may be any other digital pointing device, such as a touchpad, trackball, touchscreen of a monitor, etc. Additionally, for purposes of this application, other devices that provide, switch or route signals suitable for input to a computer are designated as "input devices". An OSD video microprocessor 72 is coupled to OSD main microprocessor 34, video processor 72 serving to transfer video switching commands to OSD video circuit 74. An address/data bus 76 couples microprocessor 34 to a non-volatile program memory 78, which may be a PROM memory, and which stores the ON SCREEN DISPLAY program. A RAM memory 80 coupled to bus 76 may provide temporary storage for keyboard and mouse data. Also coupled to bus 76 is a non-volatile memory 82, which may be an electrically erasable PROM, and which may store users names and passwords. A second I/O buffer 70 is coupled to respective keyboard and mouse ports of a one of the computers 18–24. Alternately, other devices may be coupled to this second I/O buffer 70, such as switchers, routers, other KVM switches or any other device capable of handling bidirectional keyboard and mouse signals.

One of the outputs from microprocessor 34, labeled POWER CONTROL CHANNEL, is coupled to power control microprocessor 84 (FIG. 6). This power control channel is used to communicate commands to power control microprocessor 84, in turn causing activation or deactivation of AC power switching devices coupled between computers 18, 20, 22, 24 and electrical power. This power control channel may also be used to send power status data from the power control microprocessor to the OSD main microprocessor. As such, power status of any of the computers may be ascertained through console (workstation) 26 or other devices coupled in place thereof. A nonvolatile memory 86 is coupled to microprocessor 84 by a memory bus 87, which may typically carry chip select, clock, write protection and data between microprocessor 84 and memory 86. One of these bus lines may carry a reset signal, which causes microprocessor 84 to be reset after a power loss or the Vcc potential falling below an established threshold. Memory 86 may store configuration data, such as when to switch particular ones of the computers 18, 20, 22, and 24 ON or OFF, causing the switched computers to reboot in certain situations such as after a power failure, or select a particular sequence in which the computers are to be rebooted.

For switching electrical power to computers 18, 20, 22, 24, four control lines 88, 90, 92, and 94, which carry a normally HIGH signal from I/O pins of microprocessor 84, are coupled to inverter amplifiers 96, 98, 100, 102. The outputs of these inverter amplifiers are coupled to a respective one of relay units 104, 106, 108, 110, the details of which being shown by way of example in the schematic of relay unit 104 coupled to inverter amplifier 96. Here, the output of inverter amplifier 96 is coupled via current limiting resistor 112 to the base of NPN transistor 114, with the emitter of transistor 114 coupled to a ground reference potential. The collector of transistor 114 is coupled to one end of relay coil 116, with the other end of coil 116 coupled to a positive power potential. A diode 118 is coupled across relay coil 116, and a series RC circuit 120 is coupled as shown between the collector of transistor 114 and the reference ground potential. Diode 118 and circuit 120 serve to suppress back EMF of relay coil 116 when the relay coil is deenergized. A capacitor 132 coupled between Vcc and the reference ground potential provides noise filtering, and a LED 134 coupled as shown across relay coil 116 provides a visible indication that the relay unit is energized. Relay contacts 136 are single pole single throw contacts which may be rated at 16 amps or so, and are normally open, providing a 115 VAC potential to the respective computer when closed. These contacts carry the "hot" side of the AC source, with the neutral side thereof, generally illustrated by a ground symbol, being coupled directly to computers 18, 20, 22, 24.

To energize relay coil 116, applying power to computer 18, a normally HIGH signal on control line 88 is switched LOW, which is inverted to a HIGH by inverter amplifier 96. This HIGH level switches transistor 114 ON, allowing current to flow through relay coil 116 and closing contacts 136, in turn applying AC power to computer 18. For disconnecting AC power to computer 18, the LOW on control line 88 is switched HIGH, which causes inverter amplifier 96 to develop a LOW output, switching transistor 114 OFF, deenergizing relay coil 116 and allowing contacts 136 to revert to their normally open state. Alternately, contacts 136 may be normally closed, with relay coil 116 energized to open the contacts. This may be accomplished by substituting a PNP transistor for NPN transistor 114.

Figure 7:
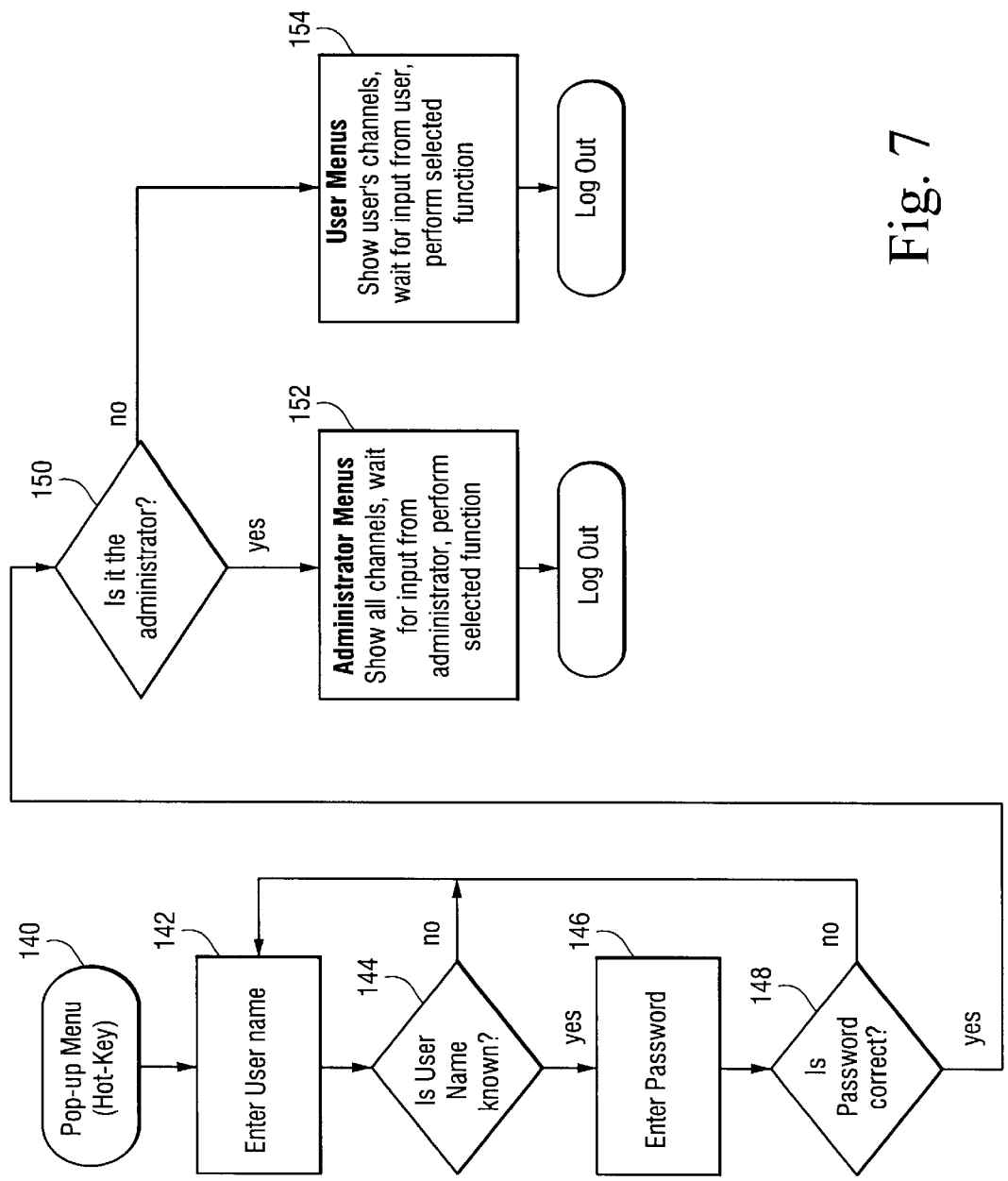
FIGS. 7, 8, and 9 are flowcharts illustrating sequences of operation of a KVM switch of the present invention.
Figure 8:
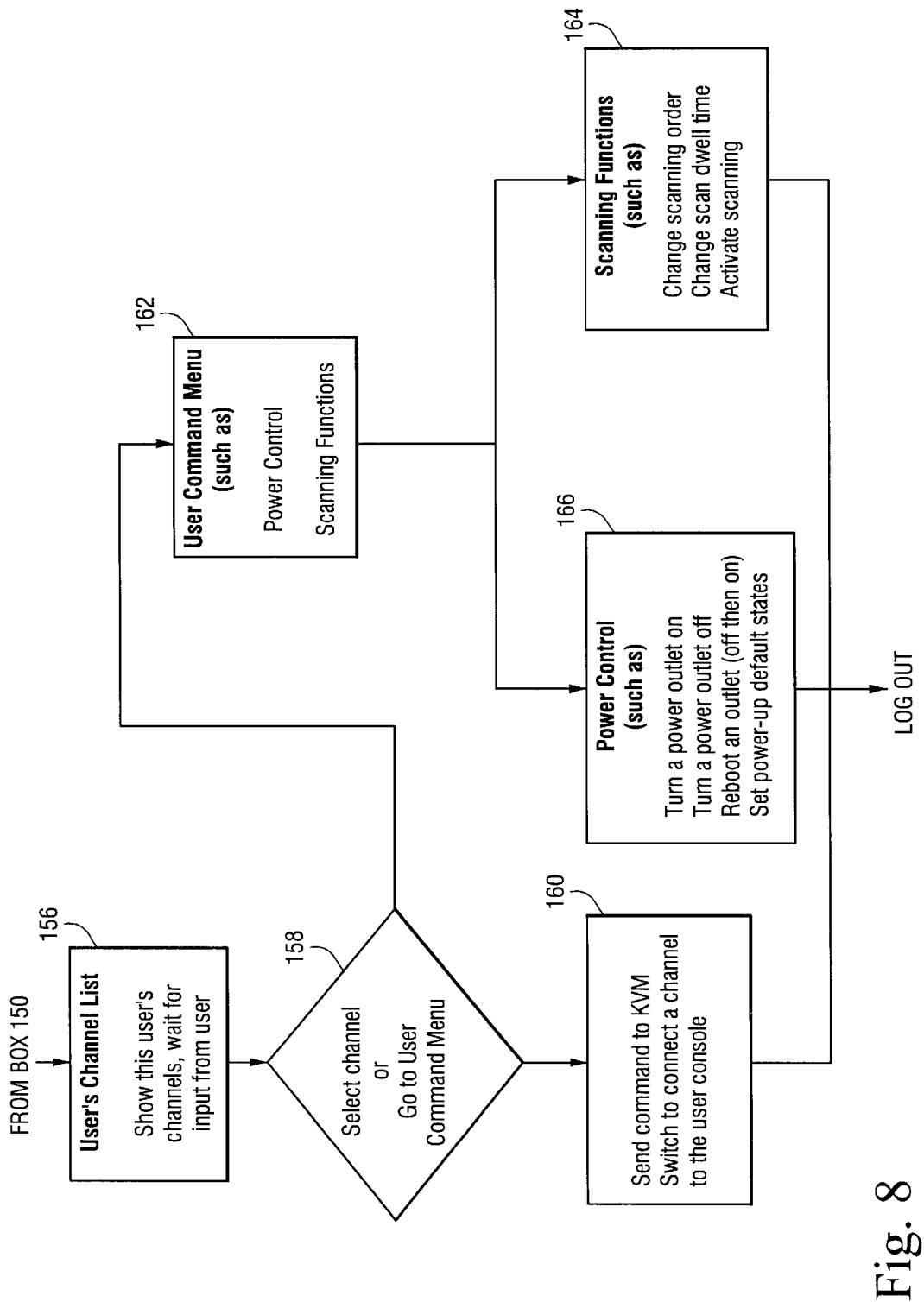
Figure 9:
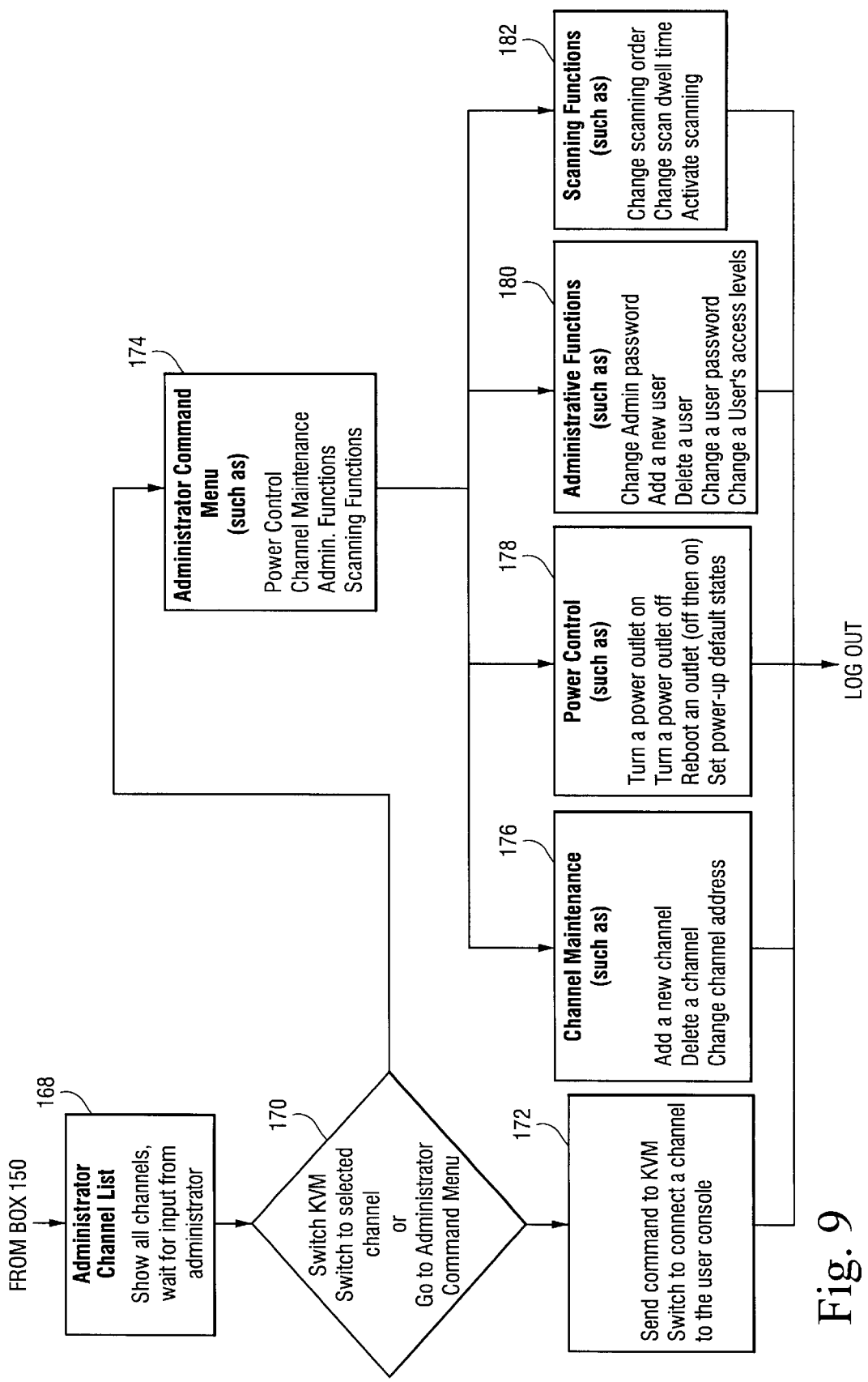

One example of software for controlling the integrated KVM and power switch is shown in the flowcharts of FIGS. 7, 8 and 9. This software may be written in assembly language and C, although a programmer skilled in the art may use other programming languages to write such software. Initially, and referring to FIG. 7, at box 140 a menu is displayed responsive to activation by the user, which may be in the form of a pop-up type menu display in response to a "hot key" combination of keystrokes on the keyboard. At box 142 the user is queried for his name or other identification. At box 144 the test is made as to whether the user's name is a valid name, with all the users names collectively stored in a data base of names cleared for access to the computers. If the user's thereof name or other ID is valid, then the program falls through to box 146, labeled ENTER PASSWORD. If the user fails to enter valid identification at box 142, then at box 144 the program loops back to box 142, where the user may again be asked to provide a valid name or other identification. Likewise, at box 148 the password entered by the user is tested as to whether it is a valid password, and if so then the program proceeds to box 150, where the determination is made as to whether the user is the system administrator or other supervisor. If the password is incorrect at box 148, then the program loops back to box 142, where the user may again be asked to provide a valid password. The number of entries for a valid name and password may be limited to a selected number of tries, such as three. If, at box 150 the user is determined to be an administrator or other supervisor, as by checking the provided name again a data base of administrators or supervisors, then the program responds by providing a supervisor's menu at box 152. If the user is not a supervisor, then at box 154 the program provides a user menu. In both cases, logoff occurs after the selected functions on either the supervisor menu or user menu are implemented, and the user indicates he/she is ready to terminate operation of the program.

In FIG. 8, software for the non-supervisory user is shown. Initially, box 156 shows a user channel list, which provides a list of channels, ports and computers that the user is able to access according to his/her security level, after which the user is prompted to provide an input at box 158. Here, the user enters keystrokes or clicks on menu buttons to switch to a different computer channel or list or control power to one or more computers. Box 158 provides the user with the option to switch the KVM switch to a different computer channel than the one it is currently accessing, as indicated at box 160, or bring up a user command menu for the KVM switch, as indicated at box 162. In the instance where switching to a different computer channel is selected, the command to cause the KVM to connect a selected computer channel to the user console is sent to the KVM unit at box 160, after which the program exits. Where the KVM user command menu is selected at box 162, the user is presented with menu options which may include a power control menu and scanning functions, which causes the KVM to automatically scan through the computer channels, this scanning accomplished in a numerical sequence or alphabetically according to channel names, or any other sequence, as determined by the user. Where the KVM scanning function menus are selected, as indicated at box 164, the user is presented with menus which may include options that change scanning order of the computer channels, alter the dwell time that each computer channel is presented on the user monitor, and activate the scanning process. After the appropriate scanning functions are implemented, the program exits.

Where power control functions are selected at box 162, the user is presented with a menu or menus at box 166 that may include options for turning a computer power outlet ON or OFF, an option for performing a "cold reboot" of a computer by first turning power to the computer OFF and then ON, and to set up power-up default states for the computers. In the latter instance, such as after a power failure, some computer power outlets may be set to provide power to the computer coupled to that channel, while other power outlet channels may be set to an OFF state until a problem or problems associated with these channels is corrected. Also, the default states for the power control options may be used to establish a particular order that power is applied to the: computers during a start-up procedure. Further, a cold reboot may be performed where a computer "hangs up", or to correct other related problems.

FIG. 9 shows operation of the administrator channel list, which is initiated as a result of a YES reply at box 150 of FIG. 7. Here, at box 168, all channels are available to the administrator for KVM switching, and the administrator is prompted to provide an input. At box 170, the test is made as to whether the administrator elected to operate the KVM switch to go to a different computer channel or proceed to the administrator command menu. Where a different computer channel is selected, the program falls through to box 172, where the switching command is sent via the KVM command channel to switch to the selected computer channel. Where the administrator command menu is selected at box 170, the program proceeds to box 174, which provides the administrator with menu options that include power control to the computers, channel maintenance, administrative functions, and computer channel scanning functions. These functions are further detailed at boxes 176, 178, 180, 182. At box 176, computer channel maintenance includes adding or deleting one or more computer channels and changing one or more computer channel addresses. At box 178, power control includes turning an outlet to one or more computers on or off, rebooting computers, and setting power-up default states for the computers. Box 180 includes administrative functions such as changing an administrative password, adding or deleting users, changing user passwords, and changing a users access level. At box 182, scanning functions include changing scanning order of the computer channels, changing the dwell time a computer channel is presented on the console monitor, and activate scanning of the computer channels.

While a single KVM switch coupled to 4 computers and a single workstation is disclosed in the foregoing, multiple KVM switches may be connected to a single KVM switch in place of the computers to form an array of KVM switches. This cascaded arrangement may be extended as needed, and allows a greater number of computers to be accessed by a single workstation. Further, up to four workstations may be coupled to a single KVM switch through the use of expansion devices such as the PC COMPANION or PC EXPANDER, manufactured by CYBEX COMPUTER PRODUCTS CORPORATION, of Huntsville, Ala., in place of the single workstation. Here, a plurality of workstations may be coupled to the PC COMPANION or EXPANDER-type product, which in turn provides inputs to a KVM switch or array of switches of the present invention. Further, extension devices, also manufactured by CYBEX COMPUTER PRODUCTS CORPORATION, allow for remotely locating the computers and workstations from the KVM switch or KVM switch array.

Having disclosed our invention and the manner of its use, it should be apparent that incidental changes may be made thereto that fairly fall under the scope of the following appended claims, wherein we claim:

What is claimed is:

1. A keyboard, video and mouse switch comprising:

a plurality of sets of computer signal ports, each of said sets of computer signal ports adapted to pass at least video signals, keyboard signals and cursor control signals, at least one set of user interface signal ports for passing at least said video signals, said keyboard signals and said cursor control signals, a source of AC electrical power potentials, a plurality of switched AC power ports for selectively providing said AC electrical power potentials, user interface circuitry responsive to said set of user interface signal ports, said user interface circuitry having a first control channel and a second control channel, signal switching circuitry responsive to said user interface circuitry and coupled to said first control channel and said plurality of sets of computer signal ports, power switching circuitry responsive to said user interface circuitry and coupled to said source of AC electrical power potentials, said second control channel and said plurality of switched AC power ports so that said AC electrical power potentials are selectively provided from discrete ones of said plurality of switched AC power ports, whereby at least one of said plurality of sets of computer signal ports is selectively couplable to said set of user interface ports, and said AC electrical power potentials are selectively couplable to said switched AC power ports, wherein said user interface circuitry further comprises at least one menu display including menu options for controlling said power switching circuitry, and wherein said power switching circuitry further comprises:

a power control microprocessor having a plurality of outputs and a communications port coupled to said second control channel, a plurality of switching means each having a control input and first and second switched terminals, one of each said control input coupled to one of each of said plurality of outputs, and said first and second switched terminals coupled between said AC electrical power potentials and a one of said AC power ports so that said AC electrical power potentials are selectively provided at said AC power ports responsive to said power control microprocessor.

2. A keyboard, video and mouse switch as set forth in claim 1 wherein said power control microprocessor, said switching means and said switched AC power ports are configured as a discrete, separate component from said keyboard, video and mouse switch.

* * * * *